US012638065B2

(12) United States Patent
Toduka et al.

(10) Patent No.: US 12,638,065 B2
(45) Date of Patent: May 26, 2026

(54) REDUCTION DEVICE

(71) Applicant: MITSUBA Corporation, Gunma (JP)

(72) Inventors: Tsuyoshi Toduka, Gunma (JP);
Masatoshi Suzuki, Gunma (JP);
Keisuke Yanagida, Gunma (JP);
Tomonori Saito, Gunma (JP); **Hiroyuki
Uchimura, Gunma (JP); Tetsuya
Watanabe**, Gunma (JP)

(73) Assignee: MITSUBA Corporation, Gunma (JP)

( * ) Notice: Subject to any disclaimer, the term of this
patent is extended or adjusted under 35
U.S.C. 154(b) by 0 days.

(21) Appl. No.: 19/211,255

(22) Filed: May 18, 2025

(65) Prior Publication Data

US 2025/0369501 A1      Dec. 4, 2025

(30) Foreign Application Priority Data

May 29, 2024      (JP) ................................. 2024-087352

(51) Int. Cl.
| *F16H 1/32* | (2006.01) |
| *F16H 57/031* | (2012.01) |
| *F16H 57/00* | (2012.01) |

(52) U.S. Cl.
CPC ............. *F16H 1/32* (2013.01); *F16H 57/031*
(2013.01); *F16H 2057/0062* (2013.01)

(58) Field of Classification Search
CPC ... F16H 1/32; F16H 57/031; F16H 2057/0062
See application file for complete search history.

(56) References Cited

U.S. PATENT DOCUMENTS

| 3,208,293 | A | * | 9/1965 | Boehm | ................... | B64C 13/24 |
| | | | | | | 475/343 |
| 2009/0007722 | A1 | * | 1/2009 | Niimi | .................... | F02N 15/046 |
| | | | | | | 74/7 E |
| 2015/0219187 | A1 | * | 8/2015 | Saito | ......................... | F16H 1/32 |
| | | | | | | 475/149 |
| 2018/0045286 | A1 | * | 2/2018 | Ishibashi | ............... | B23F 17/001 |
| 2020/0217398 | A1 | * | 7/2020 | Saito | ........................ | F16H 55/17 |
| 2023/0307990 | A1 | * | 9/2023 | Park | ................... | B60N 2/02246 |

FOREIGN PATENT DOCUMENTS

WO            2019077886            4/2019

* cited by examiner

*Primary Examiner* — Farhana Pervin
(74) *Attorney, Agent, or Firm* — JCIPRNET

(57) ABSTRACT

Provided is a reduction device for which productivity can be
improved. A motor with reduction gear includes a bracket 10
having a gear storage recess 16 with a second surface 10c
opened, a reduction mechanism 4 stored in the gear storage
recess 16, and a guide part 56 closing the second surface 10c
of the gear storage recess 16. The reduction mechanism 4
includes an internal gear 42, an eccentric shaft 41, an
oscillating gear 43 rotatably supported on an eccentric part
45 of the eccentric shaft 41, and an output part 44. An
engagement part 83 is provided on the guide part 56 and the
internal gear 42 to concavo-convex fit the guide part 56 and
the internal gear 42. The internal gear 42 is pressed by the
guide part 56 from the opening side of the gear storage
recess 16.

6 Claims, 7 Drawing Sheets

REDUCTION DEVICE

CROSS-REFERENCE TO RELATED APPLICATION

This application claims the priority benefit of Japanese application serial no. 2024-087352, filed on May 29, 2024. The entirety of the above-mentioned patent application is hereby incorporated by reference herein and made a part of this specification.

TECHNICAL FIELD

The disclosure relates to a reduction device.

BACKGROUND

Conventionally, there is known a motor with reduction gear that obtains high rotational torque by reducing the rotation of a motor part with a reduction device (reduction mechanism). Among reduction mechanisms of this motor with reduction gear, there is one that includes an annular internal gear (ring gear) attached to a bracket (gear casing), an eccentric shaft provided coaxially with the internal gear, an oscillating gear rotatably attached to an eccentric part of the eccentric shaft via a bearing, and an output part meshed with the oscillating gear.

The eccentric shaft rotates with the rotational input from the motor part. The oscillating gear includes external teeth meshed with the internal teeth of the internal gear, and internal teeth provided on the radial inner side of the external teeth. The output part is meshed with the internal teeth and rotates with reduced rotational output compared to the rotation of the eccentric shaft.

Here, an adhesive is used to fix the internal gear to the bracket. By using an adhesive, the internal gear can be firmly fixed to the bracket.

However, when using an adhesive to fix the internal gear as in the related art described above, there is a problem of poor productivity for processes of applying an adhesive and time for heating and hardening become necessary.

Therefore, the disclosure provides a reduction device for which productivity can be improved.

SUMMARY

In the first aspect of the disclosure, a reduction device includes: a bracket having a gear storage recess with one surface opened; a reduction mechanism stored in the gear storage recess; and a guide part closing the one surface of the gear storage recess. The reduction mechanism includes: an internal gear being annular and having first internal teeth; an eccentric shaft arranged coaxially with an axis of the internal gear and rotating upon receiving external power; an oscillating gear rotatably supported on the eccentric shaft, and having first external teeth meshed with the first internal teeth and having second internal teeth; and an output part arranged coaxially with the axis and having second external teeth meshed with the second internal teeth. The eccentric shaft includes: a shaft body rotating around the axis; and an eccentric part provided on the shaft body and being eccentric with respect to the axis. The oscillating gear is rotatably supported on the eccentric part. The reduction device includes at least one of a first engagement part provided on the guide part and the internal gear and concavo-convex fitting the guide part and the internal gear, and a second engagement part provided on the bracket and the internal gear and concavo-convex fitting the bracket and the internal gear. The internal gear is pressed by the guide part from a one surface side of the gear storage recess.

With such a configuration, the internal gear can be fixed to be relatively non-rotatable with respect to the guide part or the bracket. In addition to this, by pressing the internal gear from one surface side of the gear storage recess with the guide part, the internal gear can be firmly fixed. Therefore, an adhesive for fixing the internal gear as in the related art becomes unnecessary, and the productivity of the reduction device can be improved.

In the second aspect of the disclosure, in the reduction device of the first aspect, at least one of the first engagement part and the second engagement part is provided on an entire circumference of the internal gear and on an entire circumference of at least one of the guide part and the bracket.

With such a configuration, the internal gear can be fixed more firmly. Since the pressing load from the guide part to the internal gear can be distributed over the entire circumference of the internal gear, it is possible to prevent the internal gear from tilting with respect to the guide part or the bracket.

In the third aspect of the disclosure, in the reduction device of the first aspect or the second aspect, the bracket has a fixing hole provided around the gear storage recess. The guide part has a fixing tool insertion hole communicating with the fixing hole. The reduction device includes a fixing tool that is inserted through the fixing tool insertion hole of the guide part from a side opposite to the bracket and is fixed to the fixing hole, and the reduction device includes the first engagement part.

With such a configuration, the internal gear can be pressed by the guide part while utilizing the fixing tool. In this case, the fixed load of the fixing tool can be easily managed, and consequently, the pressing load applied to the internal gear by the guide part can be managed. Therefore, the internal gear can be securely fixed while preventing damage to the internal gear during assembly.

Additionally, compared to a case where the second engagement part is included, the thickness of the bracket in the axial direction can be reduced. The influence on the thickness of the guide part in the axial direction is easy to minimize. Therefore, by including the first engagement part, the reduction device can be made thinner and smaller easily.

In the fourth aspect of the disclosure, in the reduction device of the third aspect, the first engagement part is provided on a guide end surface of the guide part and a gear end surface of the internal gear that face each other in a direction of the axis. The first engagement part includes: a plurality of first fitting tooth portions that protrude from the guide end surface toward the internal gear and are arranged in alignment in a circumferential direction; and a plurality of second fitting tooth portions that protrude from the gear end surface toward the guide part and are arranged in alignment in the circumferential direction. Where an angle of a tooth surface of the first fitting tooth portion with respect to the direction of the axis is $\theta 1$, and an angle of a tooth surface of the second fitting tooth portion with respect to the direction of the axis is $\theta 2$, in a case where a rigidity of the guide part is lower than a rigidity of the internal gear, the angle $\theta 1$ and the angle $\theta 2$ satisfy: $\theta 1 < \theta 2$, and in a case where the rigidity of the internal gear is lower than the rigidity of the guide part, the angle $\theta 1$ and the angle $\theta 2$ satisfy: $\theta 1 > \theta 2$.

With such a configuration, one of the first fitting tooth portion and the second fitting tooth portion can be reliably interposed between the other fitting tooth portions adjacent in the circumferential direction, making it possible to reliably bring the fitting tooth portions into contact with each other. In this case, the fitting tooth portion with lower rigidity among the first fitting tooth portion and the second fitting tooth portion can be plastically deformed. This improves the meshing fixing force between the fitting tooth portions, so the internal gear can be firmly fixed.

Additionally, by setting the angle of the fitting tooth portion with lower rigidity among the first fitting tooth portion and the second fitting tooth portion smaller than the angle of the fitting tooth portion with higher rigidity, it is possible to promote plastic deformation of the fitting tooth portion with lower rigidity while suppressing the tilting of the fitting tooth portion with lower rigidity during meshing. Therefore, the meshing fixing force between the fitting tooth portions can be reliably improved.

In the fifth aspect of the disclosure, in the reduction device of the fourth aspect, the rigidity of the guide part is lower than the rigidity of the internal gear, and the angle $\theta1$ and the angle $\theta2$ satisfy: $\theta1 < \theta2$.

By making the rigidity of the guide part, which is the side pressing the internal gear, lower than the rigidity of the internal gear, the first fitting tooth portion can easily bite into the second fitting tooth portion. Therefore, the internal gear can be firmly fixed.

Additionally, by making the rigidity of the guide part lower, the guide part can be easily processed. For example, the bearing for rotatably supporting the eccentric shaft can be easily assembled to the guide part. For these reasons, the manufacturing cost of the reduction device can be reduced, and the productivity of the reduction device can be improved.

According to the disclosure, the productivity for the reduction device can be improved.

DESCRIPTION OF THE EMBODIMENTS

Next, an embodiment of the disclosure will be described based on the figures.

<Motor with Reduction Gear>

Figure 1:
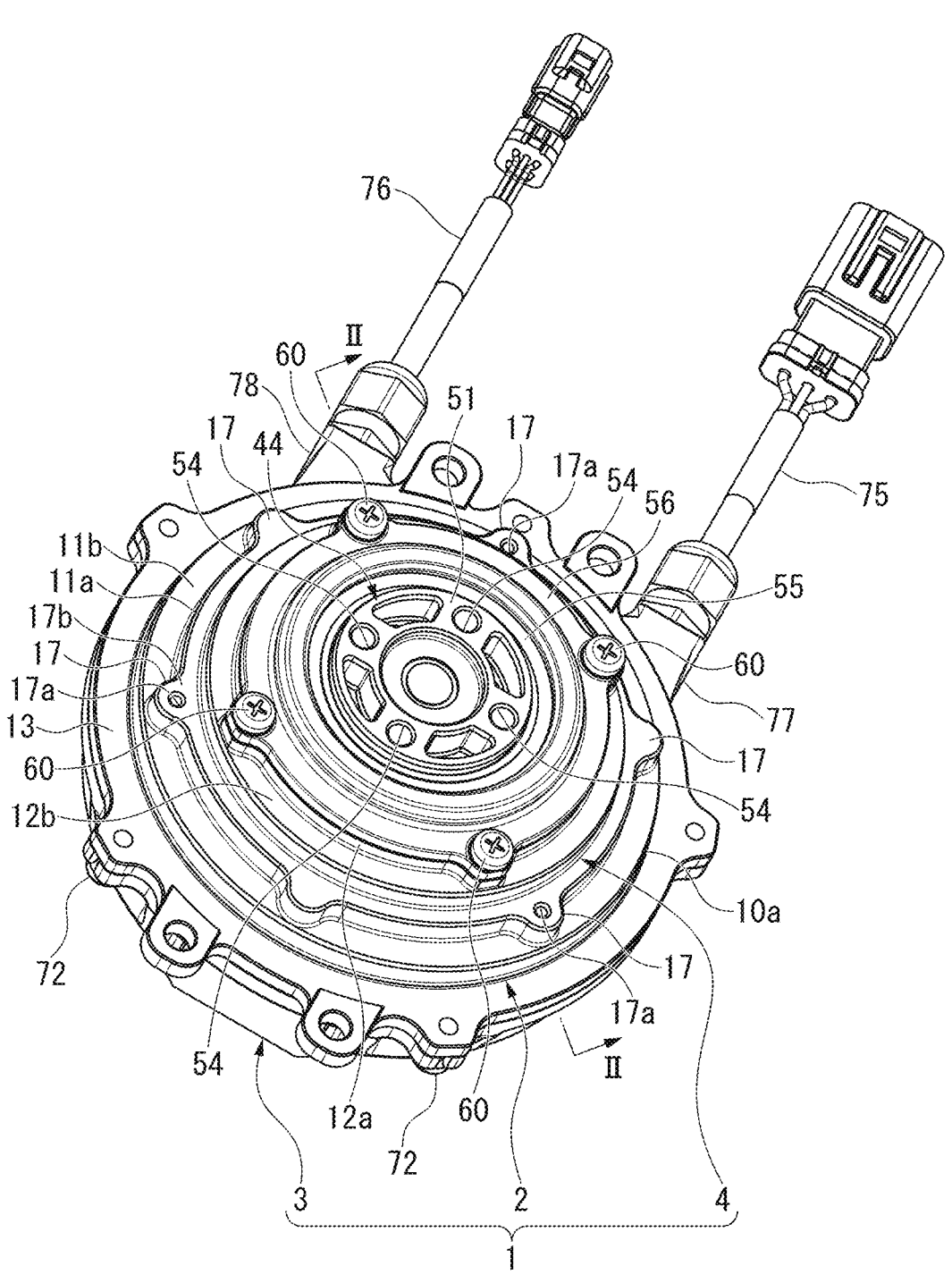
FIG. 1 is a perspective view of the motor with reduction gear in an embodiment of the disclosure.
Figure 2:
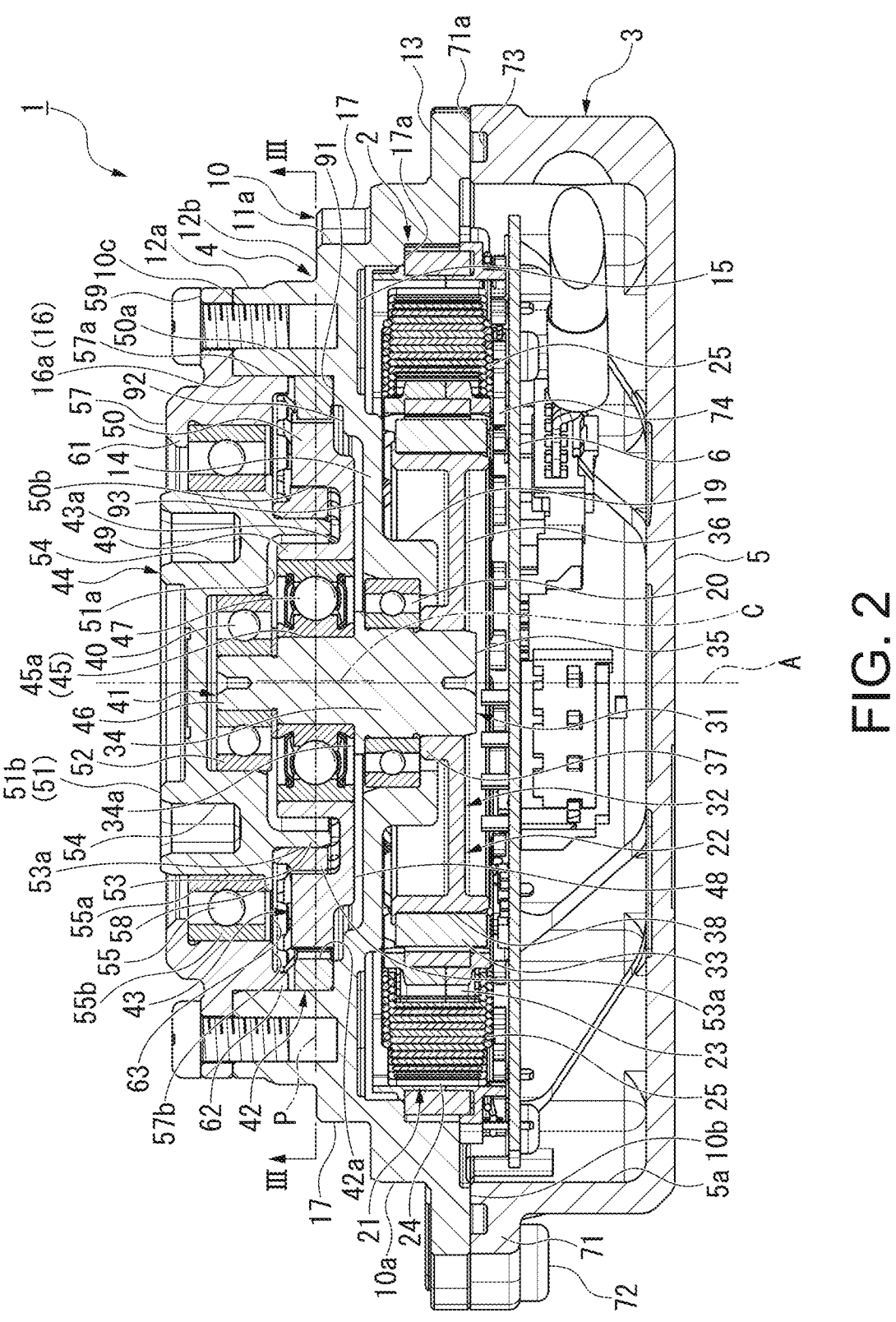
FIG. 2 is a cross-sectional view along line II-II in FIG. 1.

FIG. 1 is a perspective view of a motor with reduction gear 1. FIG. 2 is a cross-sectional view along line II-II in FIG. 1.

As shown in FIG. 1 and FIG. 2, the motor with reduction gear 1 includes a flat type motor part 2 configured as a so-called DC brushless motor, and a control part 3 and a reduction mechanism 4 that are respectively arranged on both sides in the direction of a rotation axis line A of the motor part 2 to sandwich the motor part 2.

The rotation axis line A of the motor part 2 coincides with the rotation center of an output part 44 of the reduction mechanism 4 which will be described later. In the following description, the direction parallel to the rotation axis line A is called the axial direction. The direction around the rotation axis line A is called the circumferential direction. The radial direction of the motor part 2 perpendicular to the axial direction and the circumferential direction is simply called the radial direction.

<Motor Part>

The motor part 2 includes a disc-shaped bracket 10, and a stator 21 and a rotor 22 stored in the bracket 10. The bracket 10 is formed of, for example, an aluminum alloy. An outer peripheral surface 10a of the bracket 10 has two diameter reduction parts 11a and 12a (first diameter reduction part 11a, second diameter reduction part 12a) that gradually reduce in diameter through two step surfaces 11b and 12b (first step surface 11b, second step surface 12b) as they become more distant from the control part 3. That is, on the outer peripheral surface 10a of the bracket 10, the first diameter reduction part 11a is formed with a smaller diameter than the outer peripheral surface 10a through the first step surface 11b formed on the control part 3 side (the right side in FIG. 2) with respect to the center in the axial direction. On the bracket 10, the second diameter reduction part 12a is formed with a smaller diameter than the first diameter reduction part 11a through the second step surface 12b.

Multiple (for example, six in this embodiment) bolt seats 17 that protrude to the outer side in the radial direction and are arranged on the first step surface 11b are integrally molded with the first diameter reduction part 11a. The bolt seats 17 are arranged at equal intervals in the circumferential direction. Among these bolt seats 17, for example, three bolt seats 17 each have a female screw portion for stator (not shown) formed therein. The female screw portion for stator is formed on one surface (back surface) of the corresponding bolt seat 17 on the control part 3 side. These female screw portions for stator are arranged at equal intervals in the circumferential direction. The female screw portion for stator is used for fastening and fixing the stator 21 to the bracket 10.

Among the bolt seats 17, for example, three bolt seats 17 that do not have the female screw portion for stator formed therein each have a female screw portion 17a for external device formed therein. The female screw portion 17a for external device is formed on the other surface (front surface) 17b on the side opposite to the one surface of the corresponding bolt seat 17. The female screw portion 17a for external device is used for fastening and fixing an external device (not shown).

On the outer peripheral surface 10a of the bracket 10, an outer flange part 13 that extends toward the outer side in the radial direction is integrally molded at the end on the control part 3 side. The outer flange part 13 is used for fastening and fixing the bracket 10 and a control case 5, which will be described later, of the control part 3.

In most of the center in the radial direction of the bracket 10, a motor storage recess 15 is formed on the control part 3 side with respect to the center in the axial direction, with a first surface 10b on the control part 3 side opened. In most of the center in the radial direction of the bracket 10, a gear storage recess 16 is formed on the reduction mechanism 4 side with respect to the center in the axial direction, with a second surface (an example of one surface in the claims) 10*c* on the reduction mechanism 4 side opened.

The bracket 10 is formed with a partition wall 14 between the motor storage recess 15 and the gear storage recess 16. The partition wall 14 is formed in a stepped shape that gradually shifts to the motor part 2 side as the partition wall 14 extends toward the inner side in the radial direction. That is, the partition wall 14 has an annular first partition wall 91 formed at the outermost peripheral portion, an annular second partition wall 92 formed at the inner peripheral edge of the first partition wall 91, and a disc-shaped third partition wall 93 formed on the inner side of the second partition wall 92 in the radial direction. The second partition wall 92 is arranged on the motor part 2 side with respect to the first partition wall 91 through a step part 91*a* from the inner peripheral edge of the first partition wall 91. The third partition wall 93 is arranged on the motor part 2 side with respect to the second partition wall 92 through a step part 92*a* from the inner peripheral edge of the second partition wall 92.

A cylindrical bearing housing 19 is integrally molded at the center in the radial direction of the third partition wall 93. In this bearing housing 19, a rolling bearing 20 is provided for rotatably supporting the rotor 22.

The stator 21 is stored in the motor storage recess 15. The stator 21 has an annular stator core 23 formed by laminating multiple pieces of electromagnetic steel sheets or pressure molding soft magnetic powder. The stator core 23 is fastened and fixed to the motor storage recess 15 of the bracket 10 by bolts (not shown) and female screw portions for stator.

On the inner peripheral surface of the stator core 23, multiple teeth 24 that protrude toward the radial inner side are formed in alignment in the circumferential direction. Coils 25 are wound around these teeth 24. When electricity is supplied to the coils 25, a predetermined interlinked magnetic flux is formed in the stator 21.

The rotor 22 is arranged on the inner side in the radial direction of the stator 21. The rotor 22 includes a rotor shaft 31 that is rotatably supported on the partition wall 14 via the rolling bearing 20, a rotor core 32 that is fitted to the rotor shaft 31, and a ring magnet 33 that is fixed to the rotor core 32. The axis line of the rotor shaft 31 coincides with the rotation axis line A.

The rotor shaft 31 includes a support shaft 34 supported by the rolling bearing 20, a mounting shaft 35 extending along the axial direction from the end portion on the control part 3 side of the support shaft 34, and a flange part 34*a* integrally molded at the end portion of the support shaft 34 on the side opposite to the mounting shaft 35. The outer diameter of the flange part 34*a* is larger than the inner diameter of the rolling bearing 20. This restricts displacement of the rotor shaft 31 in the axial direction.

The mounting shaft 35 is formed with a smaller diameter than the support shaft 34. The rotor core 32 is fitted to the mounting shaft 35. The rotor core 32 has a disc-shaped core body 36 arranged along the radial direction. A cylindrical inner peripheral wall 37 is formed at the center portion in the radial direction of the core body 36. The inner peripheral wall 37 protrudes toward the rolling bearing 20 side in the axial direction. This inner peripheral wall 37 is fitted to the support shaft 34.

A cylindrical outer peripheral wall 38 along the axial direction is integrally molded at the outer peripheral portion of the core body 36. The height in the axial direction of the outer peripheral wall 38 is larger than the thickness in the axial direction of the stator core 23. The entire inner side end surface in the radial direction of the teeth 24 of the stator core 23 is opposed to the outer peripheral wall 38 of the rotor core 32 in the radial direction.

The ring magnet 33 is fitted to the outer peripheral surface of such outer peripheral wall 38. The ring magnet 33 is formed in a cylindrical shape to correspond to the outer peripheral wall 38. Multiple N poles and S poles are alternately magnetized in the circumferential direction on the ring magnet 33.

The magnet fixed to the outer peripheral wall 38 is not limited to the ring magnet 33, but may be magnets divided in the circumferential direction. In this case, the magnets are fixed to the outer peripheral wall 38 so that the magnetic poles are arranged in sequence in the circumferential direction.

<Reduction Mechanism>

Figure 3:
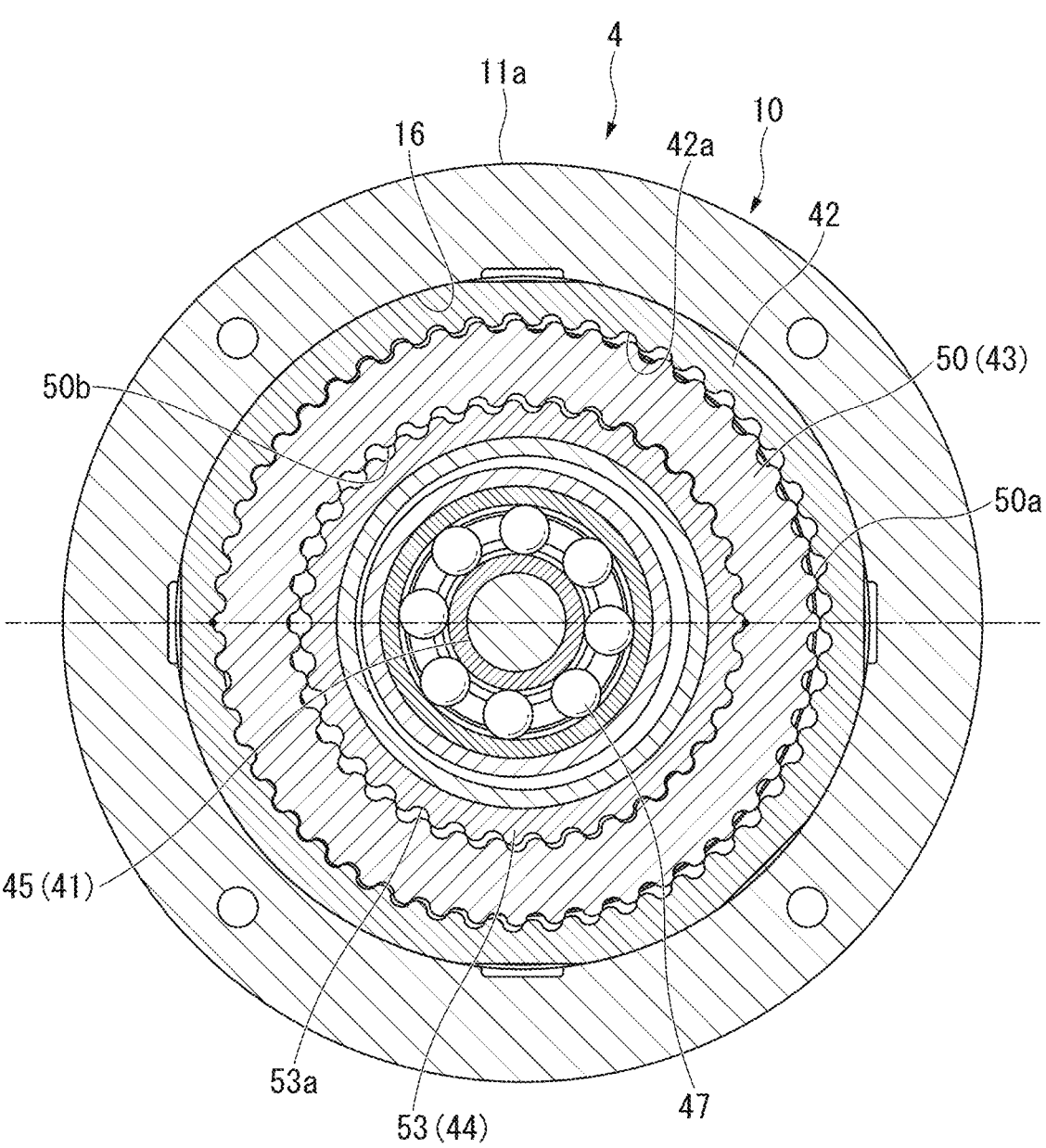
FIG. 3 is a cross-sectional view along line III-III in FIG. 2.

FIG. 3 is a cross-sectional view along line III-III in FIG. 2.

As shown in FIG. 2 and FIG. 3, an eccentric shaft 41 is integrally molded at the end portion of the rotor shaft 31 on the reduction mechanism 4 side (the left side in FIG. 2). The eccentric shaft 41 constitutes a part of the reduction mechanism 4. The reduction mechanism 4 is configured as a so-called hypo-cycloid reduction mechanism. The reduction mechanism 4 includes, in addition to the eccentric shaft 41, an internal gear 42 fixed in the gear storage recess 16 of the bracket 10, an oscillating gear 43 meshed with the internal gear 42, the output part 44 meshed with the oscillating gear 43, and a guide part 56 rotatably supporting the output part 44 and pressing the internal gear 42 from the side opposite to the motor part 2.

The eccentric shaft 41 includes an eccentric part 45 formed on the flange part 34*a* of the rotor shaft 31, and a shaft body 46 extending along the axial direction from the end of the eccentric part 45 on the side opposite to the flange part 34*a*. The eccentric part 45 is formed in a columnar shape. An outer peripheral surface 45*a* of the eccentric part 45 is formed by a cylindrical surface with a position eccentric to the rotation axis line A as a center C. The shaft body 46 is formed with the axis coinciding with the rotation axis line A.

The oscillating gear 43 is rotatably supported on the eccentric part 45 via a rolling bearing 47. The oscillating gear 43 includes a disc-shaped oscillating gear body 48 arranged along the radial direction, a cylindrical bearing housing 49 integrally molded at the radial center of the oscillating gear body 48, and a cylindrical tooth wall 50 integrally molded at the outer peripheral portion of the oscillating gear body 48. The bearing housing 49 protrudes from the oscillating gear body 48 along the axial direction toward the side opposite to the motor part 2. The tooth wall 50 protrudes from the oscillating gear body 48 in the same direction as the protrusion direction of the bearing housing 49.

With such a configuration, a recess 43*a* that opens on the side opposite to the motor part 2 (the left side in FIG. 2) is formed in the oscillating gear 43 between the bearing housing 49 and the tooth wall 50. The recess 43*a* is formed in an annular shape as viewed from the axial direction.

The bearing housing 49 of the oscillating gear 43 is rotatably supported on the eccentric part 45 via the rolling bearing 47. The tooth wall 50 is formed with external teeth 50*a* on the outer peripheral surface and internal teeth 50*b* on the inner peripheral surface. The axial center of the external teeth 50*a*, the axial center of the internal teeth 50*b*, and the axial center of the rolling bearing 47 are positioned on the same plane P in the radial direction. The internal teeth 42*a* of the internal gear 42 are meshed with the external teeth 50*a* of the oscillating gear 43.

Figure 4:
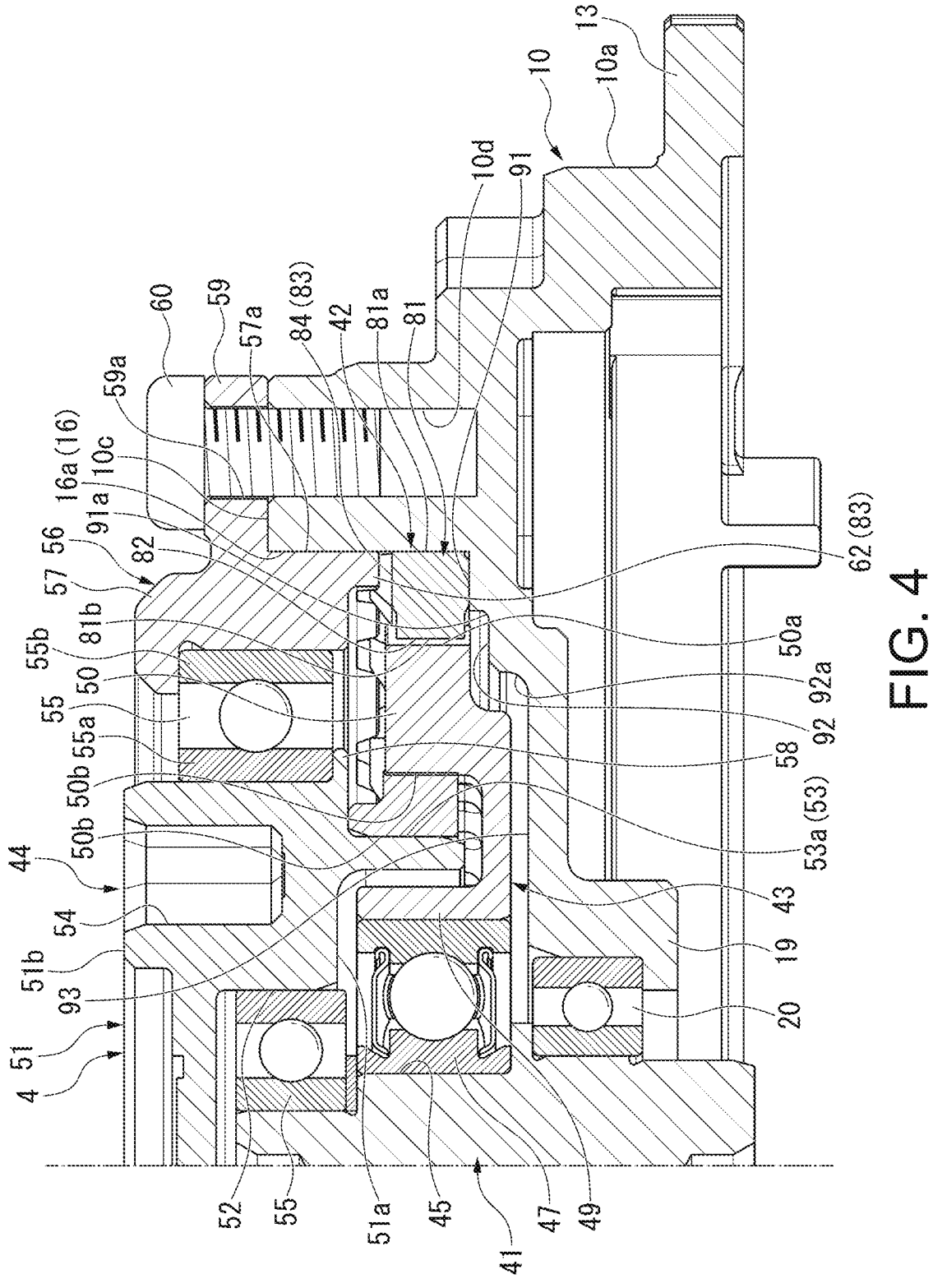
FIG. 4 is an enlarged view of the reduction mechanism in an embodiment of the disclosure.
Figure 5:
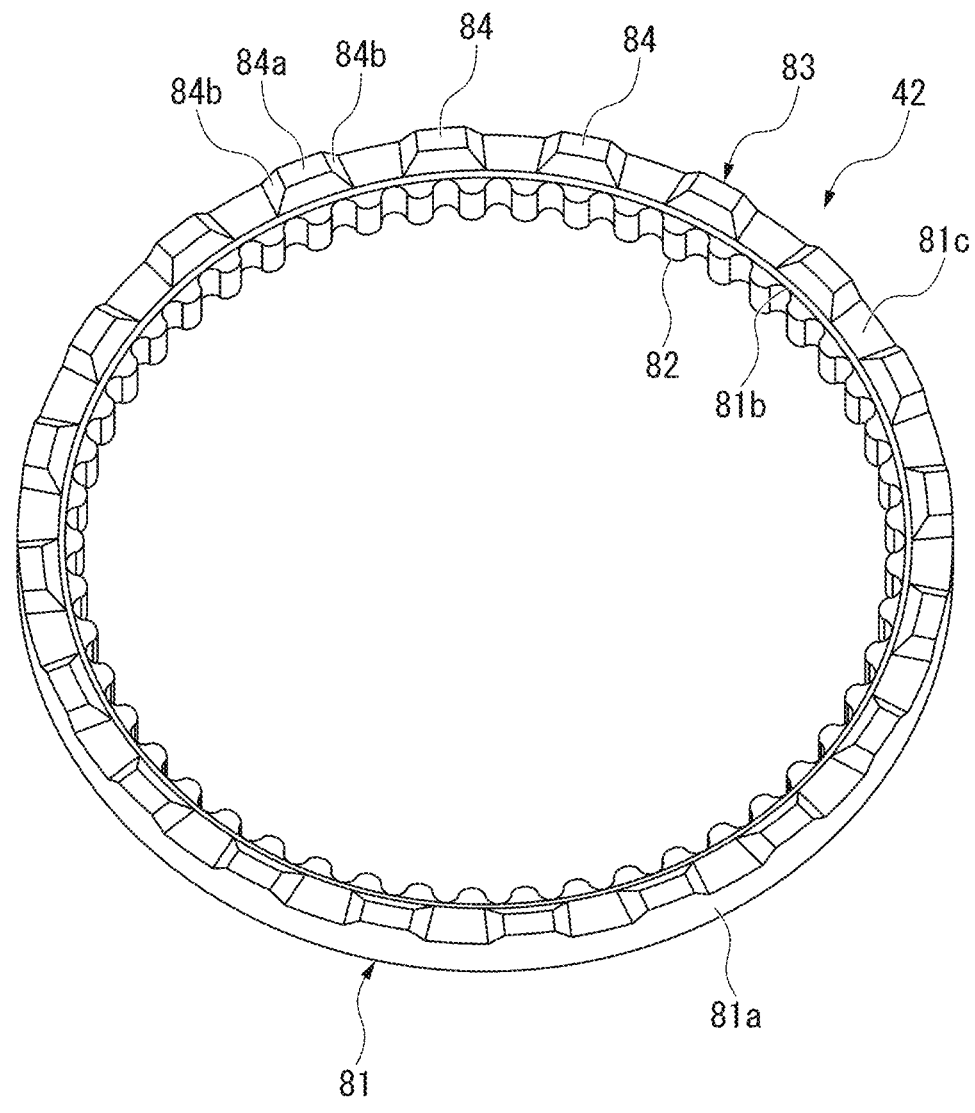
FIG. 5 is a perspective view of the internal gear in an embodiment of the disclosure as viewed from the side opposite to the motor part.

FIG. 4 is an enlarged view of the reduction mechanism 4, and shows half of the reduction mechanism 4 centered on the rotation axis line A. FIG. 5 is a perspective view of the internal gear 42 as viewed from the side opposite to the motor part 2.

As shown in FIG. 2 to FIG. 5, the internal gear 42 is formed of iron, for example, and has an annular gear body 81. The gear body 81 is arranged concentrically with the rotation axis line A. An outer peripheral surface 81*a* of the gear body 81 is lightly press-fitted to the inner peripheral surface 16*a* of the gear storage recess 16. The gear body 81 is placed on the first partition wall 91. Internal teeth 82 are formed on an inner peripheral surface 81*b* of the gear body 81.

Multiple gear-side fitting tooth portions (an example of the second fitting tooth portions in the claims) 84 are integrally molded on the end surface (an example of the gear end surface in the claims) 81*c* of the gear body 81 on the side opposite to the partition wall 14. The gear-side fitting tooth portions 84, together with the guide-side fitting tooth portions 62 which will be described later, constitute an engagement part (an example of the first engagement part in the claims) 83 that concavo-convex fits the internal gear 42 and the guide part 56 to each other (details will be described later).

The gear-side fitting tooth portions 84 protrude from the end surface 81*c* of the gear body 81 to the side opposite to the partition wall 14. Multiple gear-side fitting tooth portions 84 are arranged at equal intervals over the entire circumference. Each gear-side fitting tooth portion 84 is formed in a tapered shape where the width in the circumferential direction gradually narrows toward a tip surface 84*a*. That is, both tooth surfaces (side surfaces) 84*b* in the circumferential direction of each gear-side fitting tooth portion 84 are inclined with respect to the axial direction. Details of the inclination angle of the tooth surfaces 84*b* will be described later.

The output part 44 has a disc-shaped output part body 51 arranged along the radial direction. A bearing storage recess 52 is formed at the center in the radial direction on one surface 51*a* of the output part body 51 on the motor part 2 side. A rolling bearing 40 is stored in the bearing storage recess 52. Via this rolling bearing 40, the shaft body 46 of the eccentric shaft 41 is rotatably supported on the output part body 51.

On one surface 51*a* of the output part body 51, an external tooth ring 53 is formed protruding to the outer side in the radial direction with respect to the bearing storage recess 52. The external tooth ring 53 is formed in a cylindrical shape to correspond to the recess 43*a* of the oscillating gear 43. The external tooth ring 53 is positioned facing this recess 43*a*. On the outer peripheral surface of such an external tooth ring 53, external teeth 53*a* are formed that are meshed with the internal teeth 42*a* of the internal gear 42 and are concentric with the rotation axis line A. The external teeth 53*a* are meshed with the internal teeth 50*b* of the oscillating gear 43.

Here, the axial center of the meshing range between the internal teeth 42*a* of the internal gear 42 and the external teeth 50*a* of the oscillating gear 43 substantially coincides with the axial center of these internal teeth 42*a* and external teeth 50*a*. In addition, the axial center of the meshing range between the internal teeth 50*b* of the oscillating gear 43 and the external teeth 53*a* of the output part 44 substantially coincides with the axial center of these internal teeth 50*b* and external teeth 53*a*. That is, the axial center of the meshing range between the internal teeth 42*a* of the internal gear 42 and the external teeth 50*a* of the oscillating gear 43, the axial center of the meshing range between the internal teeth 50*b* of the oscillating gear 43 and the external teeth 53*a* of the output part 44, and the axial center of the rolling bearing 47 are positioned substantially on the same plane P in the radial direction.

On the other surface 51*b* on the side opposite to one surface 51*a* of the output part body 51, multiple (for example, four in this embodiment) female screw portions 54 are formed. These female screw portions 54 are for fastening and fixing an external device (not shown) to the output part 44.

The output part body 51 of the output part 44 is rotatably supported on the guide part 56 via a rolling bearing 55. An inner ring 55*a* of the rolling bearing 55 is fitted to the outer peripheral surface of the output part body 51. A bearing outer flange part 58 that extends from the outer peripheral surface toward the outer side in the radial direction is integrally molded at the end portion of the output part body 51 on the oscillating gear 43 side. The end portion of the inner ring 55*a* of the rolling bearing 55 on the oscillating gear 43 side is in contact with the bearing outer flange part 58. Thereby, the rolling bearing 55 is positioned in the axial direction with respect to the output part 44.

Figure 6:
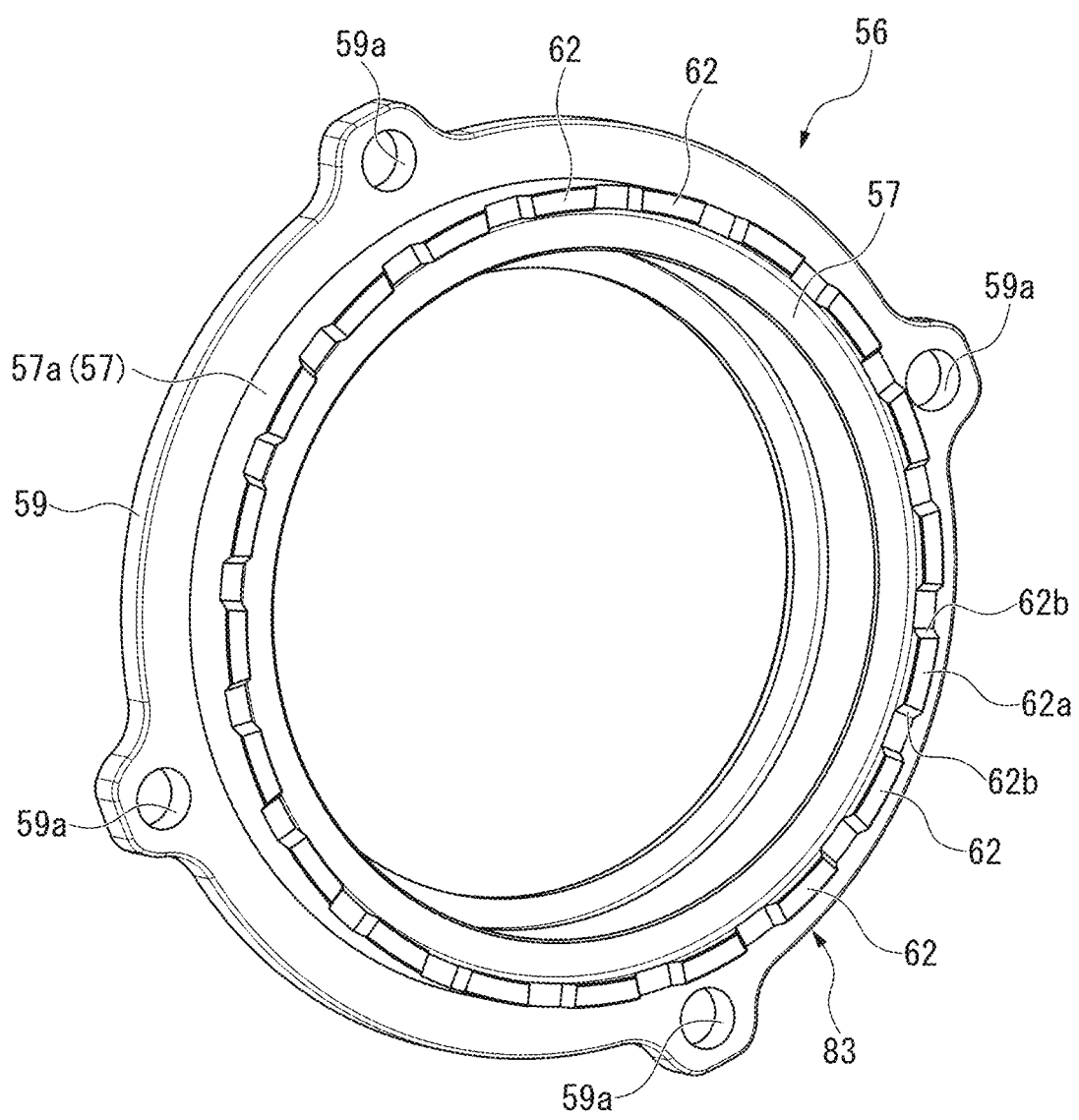
FIG. 6 is a perspective view of the guide part in an embodiment of the disclosure as viewed from the internal gear side.
Figure 7:
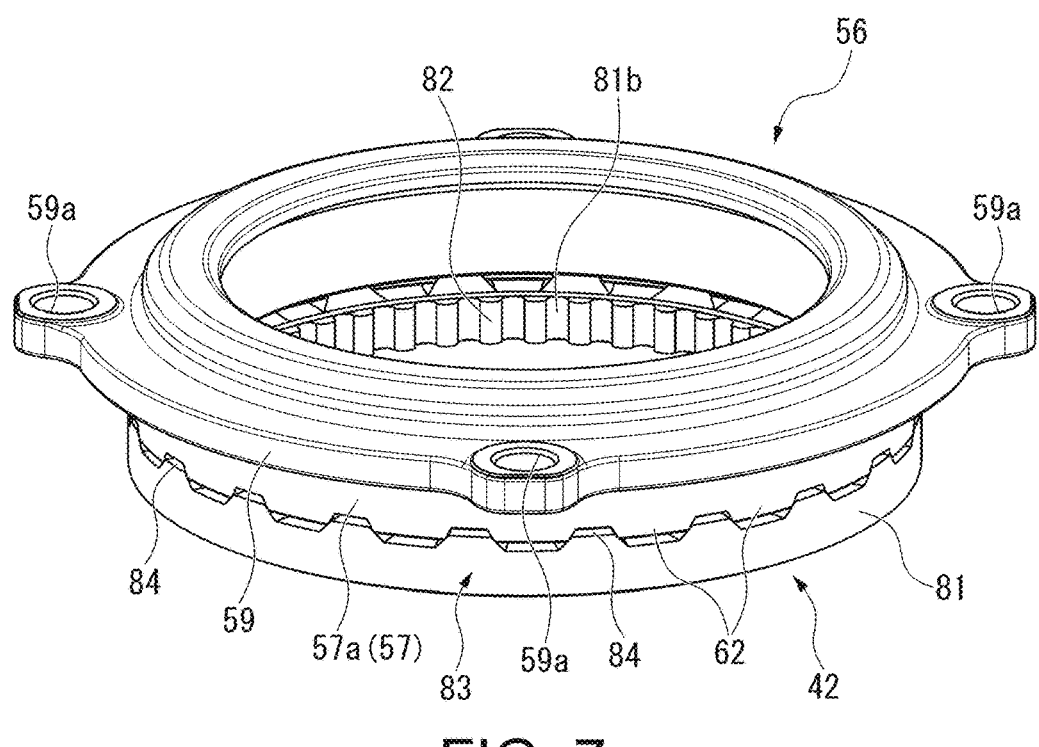
FIG. 7 is a perspective view of the guide part and the internal gear in an embodiment of the disclosure.

FIG. 6 is a perspective view of the guide part 56 as viewed from the internal gear 42 side. FIG. 7 is a perspective view of the guide part 56 and the internal gear 42.

As shown in FIG. 2 to FIG. 7, the guide part 56 has a cylindrical guide body 57 that is partially stored in the gear storage recess 16 and provided to close the opening (the second surface 10*c* of the bracket 10) of the gear storage recess 16, and a flange part 59 that extends to the radial outer side from an outer peripheral surface 57*a* of the guide body 57, which are integrally molded. The guide part 56 is formed of, for example, an aluminum alloy.

The flange part 59 is in contact with the second surface 10*c* of the bracket 10. Multiple (for example, four in this embodiment) bolt insertion holes 59*a* are formed at equal intervals in the circumferential direction in the flange part 59. Bolts 60 are inserted through the bolt insertion holes 59*a* from the side opposite to the bracket 10. The guide part 56 is fastened and fixed to the bracket 10 by screwing each bolt 60 into a female screw portion 10*d* formed in the bracket 10.

The guide body 57 is arranged on the side opposite to the control part 3 of the internal gear 42. An outer ring 55*b* of the rolling bearing 55 is fitted to the inner peripheral surface of the guide body 57. Further, a bearing inner flange part 61 that extends from the inner peripheral surface toward the radial inner side is integrally molded at the end portion of the guide body 57 on the side opposite to the internal gear 42. The end portion of the outer ring 55*b* of the rolling bearing 55 on the side opposite to the oscillating gear 43 is in contact with the bearing inner flange part 61. Thereby, the rolling bearing 55 is positioned in the axial direction with respect to the guide part 56. As a result, positioning between the guide part 56 and the output part 44 in the axial direction is performed via the rolling bearing 55.

Multiple guide-side fitting tooth portions (an example of the first fitting tooth portions in the claims) 62 are integrally molded on the end surface (an example of the guide end surface in the claims) 57*b* of the guide body 57 on the internal gear 42 side. The guide-side fitting tooth portions 62, together with the gear-side fitting tooth portions 84 of the internal gear 42, constitute the engagement part 83.

The guide-side fitting tooth portions 62 are arranged at the outer peripheral portion of the end surface 57*b* of the guide body 57. The guide-side fitting tooth portions 62 protrude from the end surface 57*b* of the guide body 57 to the internal gear 42 side. Multiple guide-side fitting tooth portions 62 are arranged at equal intervals over the entire circumference. Each guide-side fitting tooth portion 62 is formed in a tapered shape where the width in the circumferential direction gradually narrows toward a tip surface 62*a*. That is, both tooth surfaces (side surfaces) 62*b* in the circumferential direction of each guide-side fitting tooth portion 62 are inclined with respect to the axial direction.

With such a configuration, as shown in detail in FIG. 7, the guide-side fitting tooth portions 62 and the gear-side fitting tooth portions 84 are concavo-convex fitted to each other. In other words, multiple guide-side fitting tooth portions 62 and multiple gear-side fitting tooth portions 84 are meshed to be arranged alternately in the circumferential direction.

Figure 8:
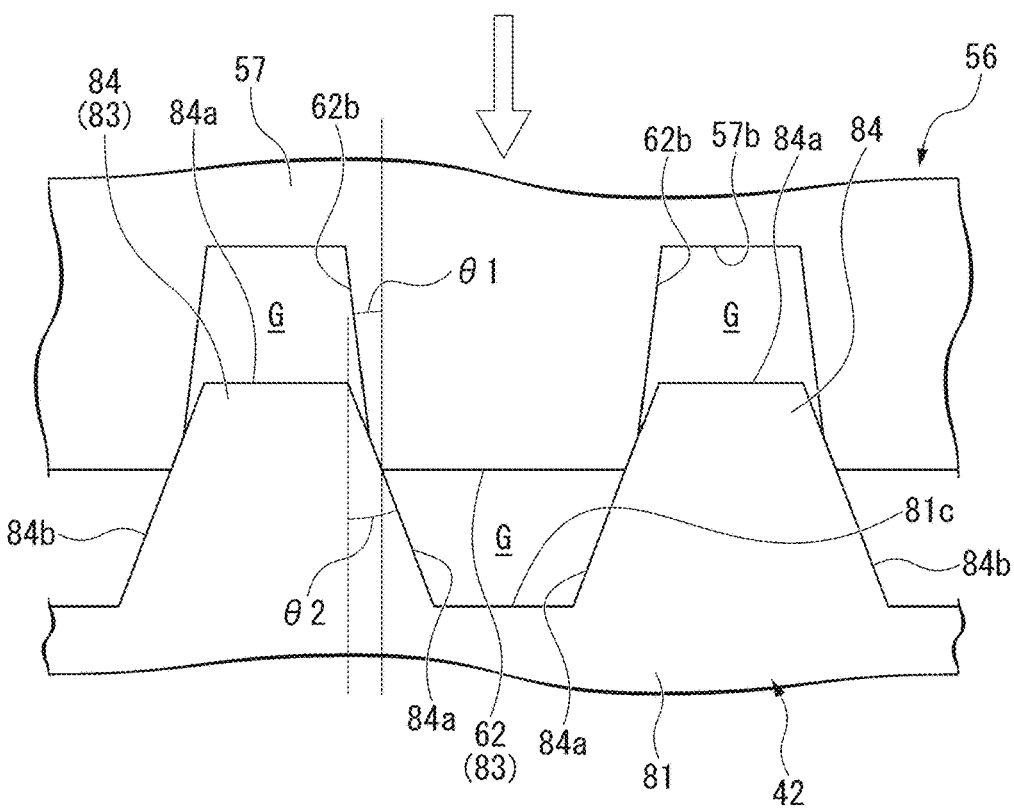
FIG. 8 is a schematic configuration view showing a state where the guide-side fitting tooth portions and the gear-side fitting tooth portions in an embodiment of the disclosure are concavo-convex fitted.

FIG. 8 is a schematic configuration view showing a state where the guide-side fitting tooth portions 62 and the gear-side fitting tooth portions 84 are concavo-convex fitted.

As shown in FIG. 8, in a case where the inclination angle of the tooth surface 62*b* of the guide-side fitting tooth portion 62 with respect to the axial direction is defined as θ1, and the inclination angle of the tooth surface 84*b* of the gear-side fitting tooth portion 84 with respect to the axial direction is defined as θ2, the inclination angles θ1 and θ2 satisfy:

$$\theta 1 < \theta 2 \tag{1}$$

Therefore, the corner portion of the tip surface 62*a* of the guide-side fitting tooth portion 62 (hereinafter simply referred to as the corner portion of the guide-side fitting tooth portion 62) is in contact with the tooth surface 84*b* of the gear-side fitting tooth portion 84. Thus, gaps G are respectively formed between the tip surface 62*a* of the guide-side fitting tooth portion 62 and the end surface 81*c* of the gear body 81, and between the tip surface 84*a* of the gear-side fitting tooth portion 84 and the end surface 57*b* of the guide body 57. The gaps G are filled with a lubricant (not shown). As a result, the meshing resistance between the internal teeth 42*a* of the internal gear 42 and the external teeth 50*a* of the oscillating gear 43, and the meshing resistance between the internal teeth 50*b* of the oscillating gear 43 and the external teeth 53*a* of the output part 44 are reduced, and the sliding resistance of the rolling bearing 55 is also reduced.

Here, the guide part 56 is formed of, for example, an aluminum alloy. The internal gear 42 is formed of, for example, iron. In other words, the rigidity of the guide part 56 is lower than the rigidity of the internal gear 42. Additionally, due to the tightening force (axial force) of the bolts 60 when fastening and fixing the guide part 56 to the bracket 10, the guide part 56 presses the internal gear 42 from the side of the second surface 10*c* (one surface where the gear storage recess 16 is opened) of the bracket 10. That is, the guide-side fitting tooth portion 62 is pressed against the gear-side fitting tooth portion 84. Thus, the corner portion of the guide-side fitting tooth portion 62 is pressed against the tooth surface 84*b* of the gear-side fitting tooth portion 84. Consequently, the corner portion of the guide-side fitting tooth portion 62 is slightly crushed. Therefore, the internal gear 42 is firmly fixed without rattling in the circumferential direction and the axial direction.

It should be noted that the rolling bearing 55 is exposed to the outside through the opening on the inner peripheral edge side of the bearing inner flange part 61 of the guide part 56. Therefore, it is desirable to provide a seal at least on the surface of the rolling bearing 55 on the bearing inner flange part 61 side. This can prevent dust or the like from entering the rolling bearing 55 from the outside.

<Control Part>

The control part 3 includes a bottomed cylindrical control case 5, and a control board 6 stored in the control case 5. The control case 5 is arranged with an opening portion 5*a* facing the motor part 2. An outer flange part 71 that extends toward the radial outer side is formed at the opening portion 5*a* of the control case 5. An end surface 71*a* of this outer flange part 71 on the motor part 2 side is in contact with the outer flange part 13 of the bracket 10. The outer flange part 71 of the control case 5 and the outer flange part 13 of the bracket 10 are fastened and fixed by multiple bolts 72 (see FIG. 1).

An O-ring groove 73 is formed on the end surface 71*a* of the outer flange part 71 of the control case 5 over the entire circumference. By mounting an O-ring (not shown) to this O-ring groove 73, sealing performance is ensured between the outer flange part 71 of the control case 5 and the outer flange part 13 of the bracket 10.

Furthermore, a cylindrical power outlet 77 and a cylindrical sensor outlet 78 are formed on the control case 5 to protrude outward. The power outlet 77 draws out a power harness 75 (which will be described later) connected to the control board 6. The sensor outlet 78 draws out a sensor harness 76.

The control board 6 is an epoxy board with multiple conductive patterns (not shown) formed thereon. The control board 6 is arranged with one surface facing the stator 21 and the rotor 22 in the axial direction. Multiple magnetic detection elements 74 are mounted on the control board 6 at positions facing the ring magnet 33 of the rotor 22 in the axial direction. The magnetic detection elements 74 detect the rotational position of the rotor 22 by detecting magnetic changes in the ring magnet 33.

The terminal portions of the coils 25 of the stator 21 are connected to the control board 6, and the terminal portion of the power harness 75 and the terminal portion of the sensor harness 76 are also connected to the control board 6. The power harness 75 is connected to an external power source (not shown). The sensor harness 76 is connected to an external control device (not shown).

The control board 6 has capacitors, etc. (not shown) mounted thereon that smooth the voltage applied to this control board 6. A power module (not shown) composed of switching elements such as FETs (Field Effect Transistors) that control the current supplied to the coils 25, for example, may also be mounted on the control board 6.

<Operation of Motor with Reduction Gear>

Next, the operation of the motor with reduction gear 1 will be described.

When a predetermined current is supplied to the coils 25 of the motor part 2 through the control part 3, a predetermined interlinked magnetic flux is formed in the stator 21. Then, magnetic attraction and repulsion forces occur between this interlinked magnetic flux and the ring magnet 33 of the rotor 22, causing the rotor 22 to rotate.

When the rotor 22 rotates, the eccentric shaft 41 integrally molded with the rotor shaft 31 of the rotor 22 rotates. When the eccentric shaft 41 rotates, the oscillating gear 43 rotates in response to this rotation. Here, the oscillating gear 43 is rotatably provided on the eccentric part 45 of the eccentric shaft 41 via the rolling bearing 47, and the external teeth 50*a* are meshed with the internal teeth 42*a* of the internal gear 42. Therefore, the oscillating gear 43 revolves around the rotation axis line A, and also rotates at a reduced speed with respect to the eccentric shaft 41 around the center C of the eccentric part 45. Through the oscillating rotation of the oscillating gear 43, the power of the output part 44 meshed with the internal teeth 50b of the oscillating gear 43 is transmitted. Thereby, the output part 44 rotates.

In the embodiment described above, the motor with reduction gear 1 includes the engagement part 83 that concavo-convex fits the internal gear 42 and the guide part 56 to each other. In addition to this, the internal gear 42 is pressed by the guide part 56 from the second surface 10c (one surface where the gear storage recess 16 is opened) side of the bracket 10. Therefore, the internal gear 42 can be fixed to be relatively non-rotatable with respect to the guide part 56. Thus, an adhesive for fixing the internal gear 42 as in the related art becomes unnecessary, and the productivity of the motor with reduction gear 1 can be improved.

The engagement part 83 is provided over the entire circumference of the internal gear 42 and the guide part 56. Therefore, the internal gear 42 can be fixed more firmly. Since the pressing load from the guide part 56 to the internal gear 42 can be distributed over the entire circumference of the internal gear 42, it is possible to prevent the internal gear 42 from tilting with respect to the guide part 56 or the bracket 10.

The guide part 56 is fastened and fixed to the bracket 10 by the bolts 60. By providing the engagement part 83 on such guide part 56 and internal gear 42, the internal gear 42 can be pressed by the guide part 56 while utilizing the tightening force of the bolts 60. In this case, the tightening force brought by the bolts 60 can be easily managed. Consequently, the pressing load from the guide part 56 to the internal gear 42 can be managed. Therefore, the internal gear 42 can be securely fixed while preventing damage to the internal gear 42 during assembly.

For example, in a case of attempting to provide the engagement part 83 on the bracket 10, it is necessary to form the partition wall 14 thick in order to receive the gear-side fitting tooth portion 84. In particular, the first partition wall 91 becomes thicker. Compared to such a case, in the case where the engagement part 83 is provided on the guide part 56, the influence on the thickness of the guide part 56 in the axial direction is small. Therefore, by providing the engagement part 83 on the guide part 56 and the internal gear 42, the motor with reduction gear 1 can be made thinner and smaller easily.

The engagement part 83 is constituted by the gear-side fitting tooth portions 84 and the guide-side fitting tooth portions 62. The rigidity of the guide-side fitting tooth portion 62 is lower than the rigidity of the gear-side fitting tooth portion 84. Further, the inclination angle $\theta1$ of the tooth surface 62b in the guide-side fitting tooth portion 62, and the inclination angle $\theta2$ of the tooth surface 84b in the gear-side fitting tooth portion 84 satisfy the above formula (1). By configuring in this way, the guide-side fitting tooth portion 62 can be reliably interposed between adjacent gear-side fitting tooth portions 84 in the circumferential direction. The corner portion of the guide-side fitting tooth portion 62 can be reliably brought into contact with the tooth surfaces 84b of the gear-side fitting tooth portions 84. Then, by crushing and plastically deforming the corner portion of the guide-side fitting tooth portion 62 with lower rigidity, the meshing fixing force between the fitting tooth portions 62 and 84 can be improved. Therefore, the internal gear 42 can be firmly fixed.

In addition, by setting the inclination angle $\theta1$ of the guide-side fitting tooth portion 62 with lower rigidity smaller than the inclination angle $\theta2$ of the gear-side fitting tooth portion 84 with higher rigidity, it is possible to promote plastic deformation of the guide-side fitting tooth portion 62 while suppressing the guide-side fitting tooth portion 62 from collapsing and deforming when the fitting tooth portions 62 and 84 mesh with each other. Therefore, the meshing fixing force between the fitting tooth portions 62 and 84 can be reliably improved.

Moreover, by making the rigidity of the guide part 56, which is the side pressing the internal gear 42, lower than the rigidity of the internal gear 42, the guide-side fitting tooth portion 62 can easily bite into the gear-side fitting tooth portion 84. Therefore, the internal gear 42 can be reliably fixed.

In addition, by making the rigidity of the guide part 56 lower, the guide part 56 can be easily processed. For example, the rolling bearing 55 for rotatably supporting the eccentric shaft 41 can be easily assembled to the guide part 56. For these reasons, the manufacturing cost of the motor with reduction gear 1 can be reduced, and the productivity of the motor with reduction gear 1 can be improved.

Since the productivity of the motor with reduction gear 1 can be improved, it is possible to contribute to the Sustainable Development Goals (SDGs) Goal 7 "Ensure access to affordable, reliable, sustainable and modern energy for all" and Goal 9 "Build resilient infrastructure, promote inclusive and sustainable industrialization and foster innovation" led by the United Nations.

The disclosure is not limited to the embodiments described above, but includes various modifications added to the above embodiments within a range that does not deviate from the spirit of the disclosure.

For example, the above embodiment illustrates a case where the guide-side fitting tooth portions 62 are formed on the guide part 56 and the gear-side fitting tooth portions 84 are formed on the internal gear 42. A case is illustrated where the engagement part 83 is configured by these guide-side fitting tooth portions 62 and gear-side fitting tooth portions 84 to concavo-convex fit the guide part 56 and the internal gear 42 to each other. However, the disclosure is not limited thereto, and an engagement part (the second engagement part in the claims) that concavo-convex fits the bracket 10 and the internal gear 42 may be provided.

In this case, the engagement part may be provided on the first partition wall 91 and the end surface of the gear body 81 placed on the first partition wall 91. The engagement part may be provided on the outer peripheral surface 81a of the gear body 81 and the inner peripheral surface 16a of the gear storage recess 16. For example, the outer peripheral surface 81a of the gear body 81 and the inner peripheral surface 16a of the gear storage recess 16 may be engaged by spline fitting. With such a configuration, it is sufficient that the internal gear 42 is pressed by the guide part 56 from the second surface 10c (one surface of the gear storage recess 16) side of the bracket 10.

The above embodiment illustrates a case where the engagement part 83 is provided over the entire circumference of the internal gear 42 and the guide part 56. However, the disclosure is not limited thereto, and it is sufficient that the engagement part 83 is provided in at least one location. For example, a key may be provided on one of the internal gear 42 and the guide part 56, and a key groove may be provided on the other, and these key and key groove may be concavo-convex fitted. This is also the same in the case where the internal gear 42 and the bracket 10 are concavo-convex fitted.

The above embodiment illustrates a case where the guide part 56 is fastened and fixed to the bracket 10 using the bolts 60. However, the disclosure is not limited thereto, and any fixing tool that is inserted through the bolt insertion hole 59*a* of the guide part 56 and fixes the guide part 56 to the bracket 10 may be used. For example, as the fixing tool, a caulking pin may be used instead of the bolt 60. Even with such a configuration, the fixed load of the fixing tool (for example, the caulking pin) can be easily managed, and consequently, the pressing load applied to the internal gear 42 by the guide part 56 can be managed.

The above embodiment illustrates a case where the rigidity of the guide-side fitting tooth portion 62 is lower than the rigidity of the gear-side fitting tooth portion 84. A case is illustrated where the inclination angle θ1 of the tooth surface 62*b* in the guide-side fitting tooth portion 62 and the inclination angle θ2 of the tooth surface 84*b* in the gear-side fitting tooth portion 84 satisfy the above formula (1). However, the disclosure is not limited thereto, and the rigidity of the guide-side fitting tooth portion 62 may be higher than the rigidity of the gear-side fitting tooth portion 84.

In this case, the inclination angles θ1 and θ2 satisfy:

$$\theta1 > \theta2 \tag{2}$$

That is, the relationship between the fitting tooth portions 62 and 84 and the inclination angles θ1 and θ2 is such that the inclination angle θ1, θ2 of the fitting tooth portion with lower rigidity among the fitting tooth portions 62 and 84 is smaller than the inclination angle θ1, θ2 of the fitting tooth portion with higher rigidity. This is also the same in the case where the internal gear 42 and the bracket 10 are concavo-convex fitted.

The above embodiment illustrates a case where the rolling bearings 20, 40, and 47 are adopted as the bearings used in the motor with reduction gear 1. However, the disclosure is not limited thereto, and various bearings can be adopted.

What is claimed is:

1. A reduction device, comprising:
   a bracket having a gear storage recess with one surface opened;
   a reduction mechanism stored in the gear storage recess; and
   a guide part closing the one surface of the gear storage recess,
   wherein the reduction mechanism comprises:
   an internal gear being annular and having first internal teeth;
   an eccentric shaft arranged coaxially with an axis of the internal gear and rotating upon receiving external power;
   an oscillating gear rotatably supported on the eccentric shaft, and having first external teeth meshed with the first internal teeth and having second internal teeth; and
   an output part arranged coaxially with the axis and having second external teeth meshed with the second internal teeth,
   wherein the eccentric shaft comprises:
   a shaft body rotating around the axis; and
   an eccentric part provided on the shaft body and being eccentric with respect to the axis,
   wherein the oscillating gear is rotatably supported on the eccentric part,
   wherein the reduction device comprises at least one of a first engagement part provided on the guide part and the internal gear and concavo-convex fitting the guide part and the internal gear, and a second engagement part provided on the bracket and the internal gear and concavo-convex fitting the bracket and the internal gear,
   wherein the internal gear is pressed by the guide part from a one surface side of the gear storage recess.

2. The reduction device according to claim 1, wherein at least one of the first engagement part and the second engagement part is provided on an entire circumference of the internal gear and on an entire circumference of at least one of the guide part and the bracket.

3. The reduction device according to claim 1, wherein the bracket has a fixing hole provided around the gear storage recess,
   the guide part has a fixing tool insertion hole communicating with the fixing hole,
   the reduction device comprises a fixing tool that is inserted through the fixing tool insertion hole of the guide part from a side opposite to the bracket and is fixed to the fixing hole, and
   the reduction device comprises the first engagement part.

4. The reduction device according to claim 2, wherein the bracket has a fixing hole provided around the gear storage recess,
   the guide part has a fixing tool insertion hole communicating with the fixing hole,
   the reduction device comprises a fixing tool that is inserted through the fixing tool insertion hole of the guide part from a side opposite to the bracket and is fixed to the fixing hole, and
   the reduction device comprises the first engagement part.

5. The reduction device according to claim 3, wherein the first engagement part is provided on a guide end surface of the guide part and a gear end surface of the internal gear that face each other in a direction of the axis,
   the first engagement part comprises:
   a plurality of first fitting tooth portions that protrude from the guide end surface toward the internal gear and are arranged in alignment in a circumferential direction; and
   a plurality of second fitting tooth portions that protrude from the gear end surface toward the guide part and are arranged in alignment in the circumferential direction,
   where an angle of a tooth surface of the first fitting tooth portion with respect to the direction of the axis is θ1, and an angle of a tooth surface of the second fitting tooth portion with respect to the direction of the axis is θ2,
   in a case where a rigidity of the guide part is lower than a rigidity of the internal gear, the angle θ1 and the angle θ2 satisfy:

$$\theta1 < \theta2, \text{ and}$$

in a case where the rigidity of the internal gear is lower than the rigidity of the guide part, the angle θ1 and the angle θ2 satisfy:

$$\theta1 > \theta2.$$

6. The reduction device according to claim 5, wherein the rigidity of the guide part is lower than the rigidity of the internal gear, and the angle θ1 and the angle θ2 satisfy:

$$\theta1 < \theta2.$$

* * * * *